(12) United States Patent
Yoo et al.

(10) Patent No.: US 7,636,148 B2
(45) Date of Patent: Dec. 22, 2009

(54) APPARATUS AND METHOD FOR REPAIRING LIQUID CRYSTAL DISPLAY DEVICE

(75) Inventors: Soon Sung Yoo, Gunpo-si (KR); Oh Nam Kwon, Yongin-si (KR); Heung Lyul Cho, Suwon-si (KR); Seung Hee Nam, Suwon-si (KR)

(73) Assignee: LG Display Co., Ltd., Seoul (KR)

( * ) Notice: Subject to any disclaimer, the term of this patent is extended or adjusted under 35 U.S.C. 154(b) by 581 days.

(21) Appl. No.: 11/289,449

(22) Filed: Nov. 30, 2005

(65) Prior Publication Data

US 2006/0126003 A1 Jun. 15, 2006

(30) Foreign Application Priority Data

Dec. 14, 2004 (KR) ............. 10-2004-0105889
Dec. 14, 2004 (KR) ............. 10-2004-0105891
Dec. 14, 2004 (KR) ............. 10-2004-0105892

(51) Int. Cl.
G02F 1/13 (2006.01)

(52) U.S. Cl. .......................................... 349/192

(58) Field of Classification Search ............. 349/192
See application file for complete search history.

(56) References Cited

U.S. PATENT DOCUMENTS 5,142,386 A * 8/1992 Ishihara .............. 349/192
6,812,992 B2 * 11/2004 Nemeth .............. 349/192
2006/0181672 A1 8/2006 Son

* cited by examiner

Primary Examiner—James A Dudek
(74) Attorney, Agent, or Firm—McKenna Long & Aldridge LLP (57) ABSTRACT

The present invention relates to an apparatus and method for repairing a liquid crystal display panel, which is capable of improving a yield thereof by darkening a bright point to minimize a defect ratio thereof. An apparatus for repairing a liquid crystal display panel according to the present invention includes: a liquid crystal display panel including a repair film formed on any one of a first substrate and a second substrate, which are facing to each other with a liquid crystal layer therebetween; and a laser irradiating device to irradiate a laser to the repair film to darken a specific area of the repair film, which is corresponded to an area where a bright point appears in the liquid crystal display panel.

19 Claims, 11 Drawing Sheets

FIG.12

# APPARATUS AND METHOD FOR REPAIRING LIQUID CRYSTAL DISPLAY DEVICE

This application claims the benefit of Korean Patent Application Nos. P2004-105889, P2004-105891, and P2004-105892, filed on Dec. 14, 2004, which is hereby incorporated by reference for all purposes as if fully set forth herein.

BACKGROUND OF THE INVENTION

1. Field of the Invention

The present invention relates to an apparatus and method for repairing a liquid crystal display panel, and more particularly, to an apparatus and method for repairing a liquid crystal display panel, which is capable of improving a yield thereof by darkening a bright point to minimize a defect ratio thereof.

2. Discussion of the Related Art

Generally, a liquid crystal display (LCD) device controls the light transmittance of a liquid crystal material in accordance with a video signal to display a picture. For this, the liquid crystal display device includes a liquid crystal display panel in which liquid crystal cells are arranged in a matrix configuration, and a drive circuit to drive the liquid crystal display panel.

The liquid crystal display device is divided into two main classes of a twisted nematic (TN) mode in which a vertical direction electric field is used and an in-plane switch (ISP) mode in which a horizontal direction electric field is used, in accordance with the electric field direction in which a liquid crystal material is driven.

In the TN mode the liquid crystal material is driven by a vertical electric field between a pixel electrode and a common electrode that are arranged to be opposite to each other on a lower substrate and an upper substrate respectively. The TN mode has an advantage in that its aperture ratio is big, but a disadvantage in that its viewing angle is small. In the IPS mode the liquid crystal material is driven by a horizontal electric field between the pixel electrode and the common electrode that are arranged in parallel in a lower substrate. The IPS mode has an advantage in that its viewing angle is big, but a disadvantage in that its aperture ratio is small.

Figure 1:
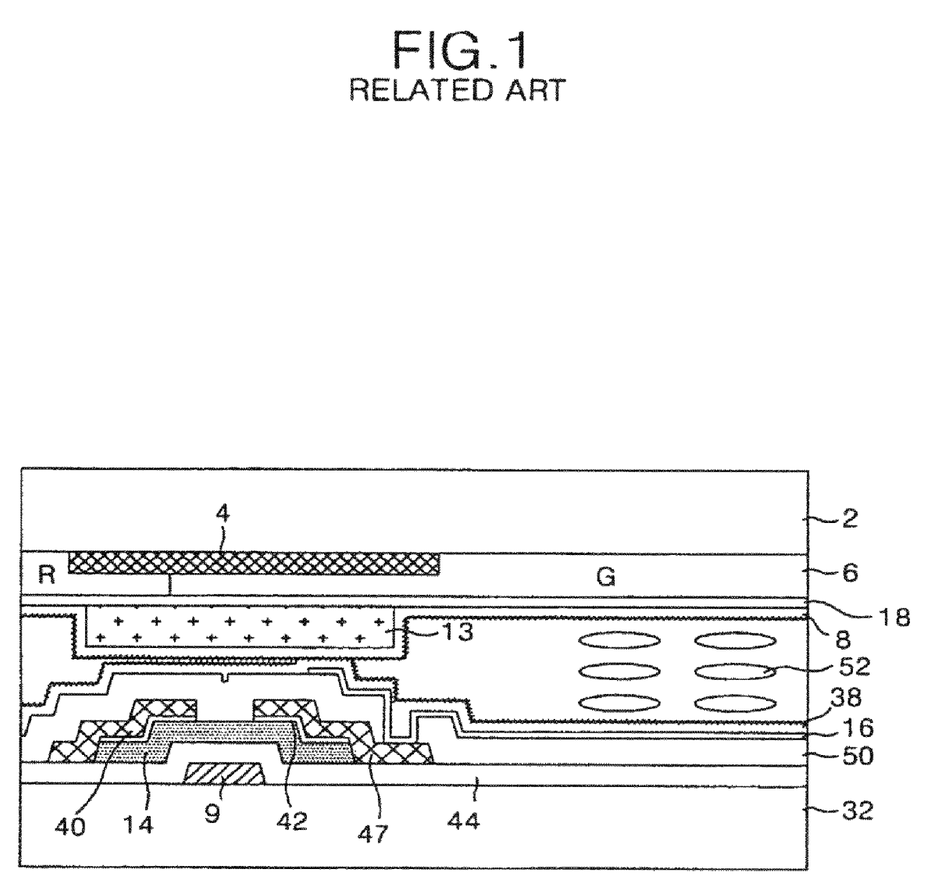
FIG. 1 is a sectional view illustrating a related art liquid crystal display panel.

FIG. 1 is a sectional view illustrating a liquid crystal display panel of TN mode of the related art.

Referring to FIG. 1, the related art TN mode liquid crystal display panel includes an upper array substrate (or a color filter array substrate) having a black matrix 4, a color filter 6, a common electrode 18, and an upper alignment film 8 that are sequentially formed on an upper substrate 2; a lower array substrate having a thin film transistor (hereinafter, referred to as "TFT"), a pixel electrode 16 and a lower alignment film 38 that are formed on a lower substrate 32; and a liquid crystal material 52 injected into an inner space between the upper array substrate and the lower array substrate.

On the other hand, the IPS mode liquid crystal display panel has the common electrode 18 formed on the lower substrate 32 and an overcoat layer (not shown) formed on the color filter 6 of the upper substrate 2, wherein the overcoat layer is for compensating the stepped difference of the color filter 6.

On the upper array substrate of the IPS mode liquid crystal display panel, the black matrix 4 is formed on the upper substrate 2 and corresponds to an area of gate lines and data lines (not shown) and a TFT area of the lower array substrate. The black matrix 4 provides a cell area where a color filter 6 is to be formed. The black matrix 4 prevents light leakage and absorbs external light, thereby increasing contrast. The color filter 6 is formed to extend to the black matrix 4 and the cell area divided by the black matrix 4. The color filter 6 is formed by Red, Green and Blue to realize R, G and B colors. A common voltage is supplied to the common electrode 18 to control the movement of the liquid crystal material. A pattern spacer 13 maintains a cell gap between the upper array substrate and the lower array substrate.

The TFT on the lower array substrate includes a gate electrode 9 formed on the lower substrate 32 along with a gate line; semiconductor layers 14, 42 overlapping the gate electrode 9 with a gate insulating film 44 therebetween; and source/drain electrodes 40, 47 formed together with a data line (not shown) with the semiconductor layers 14, 42 therebetween. The TFT supplies a pixel signal to a pixel electrode 16 from the data line in response to a scan signal from the gate line. The pixel electrode 16 is in contact with the drain electrode 47 of the TFT with a passivation film 50 therebetween, wherein the passivation film 50 is formed of a transparent conductive material with high light transmittance. The upper and the lower alignment films 8 and 38 for aligning the liquid crystal material are formed by applying an alignment material such as polyimide and performing a rubbing process.

If a defect is generated at each thin film of the upper array substrate and the lower array substrate of the related art liquid crystal display panel, a repair is performed by rework or using a laser. However, if a particle is soundly settled between the thin films of both the upper array substrate and the lower array substrate, it becomes impossible to do the repair by rework or laser.

Figure 2:
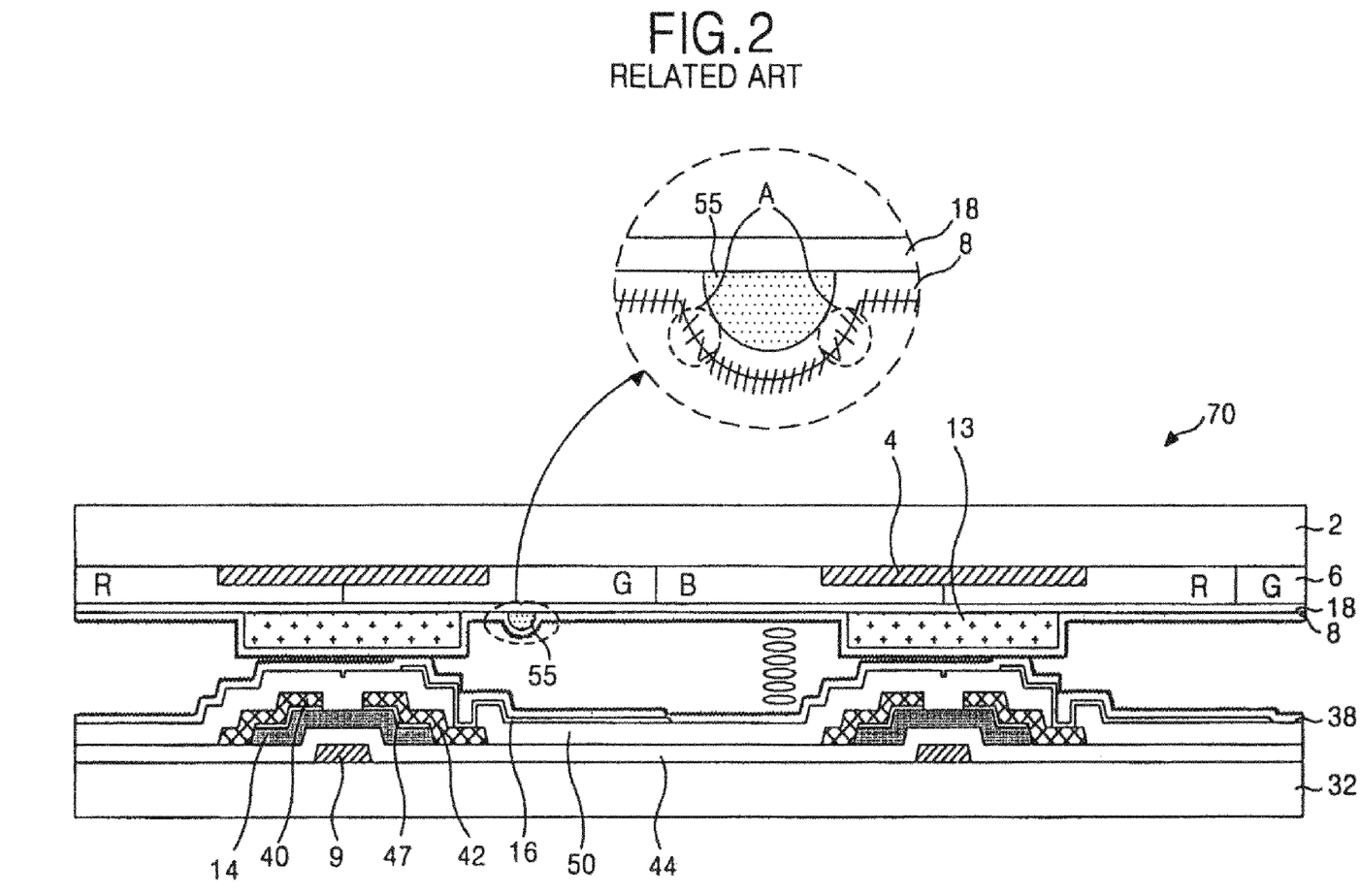
FIG. 2 is a sectional view for explaining an alignment defect caused by an airborne particle.
Figure 3:
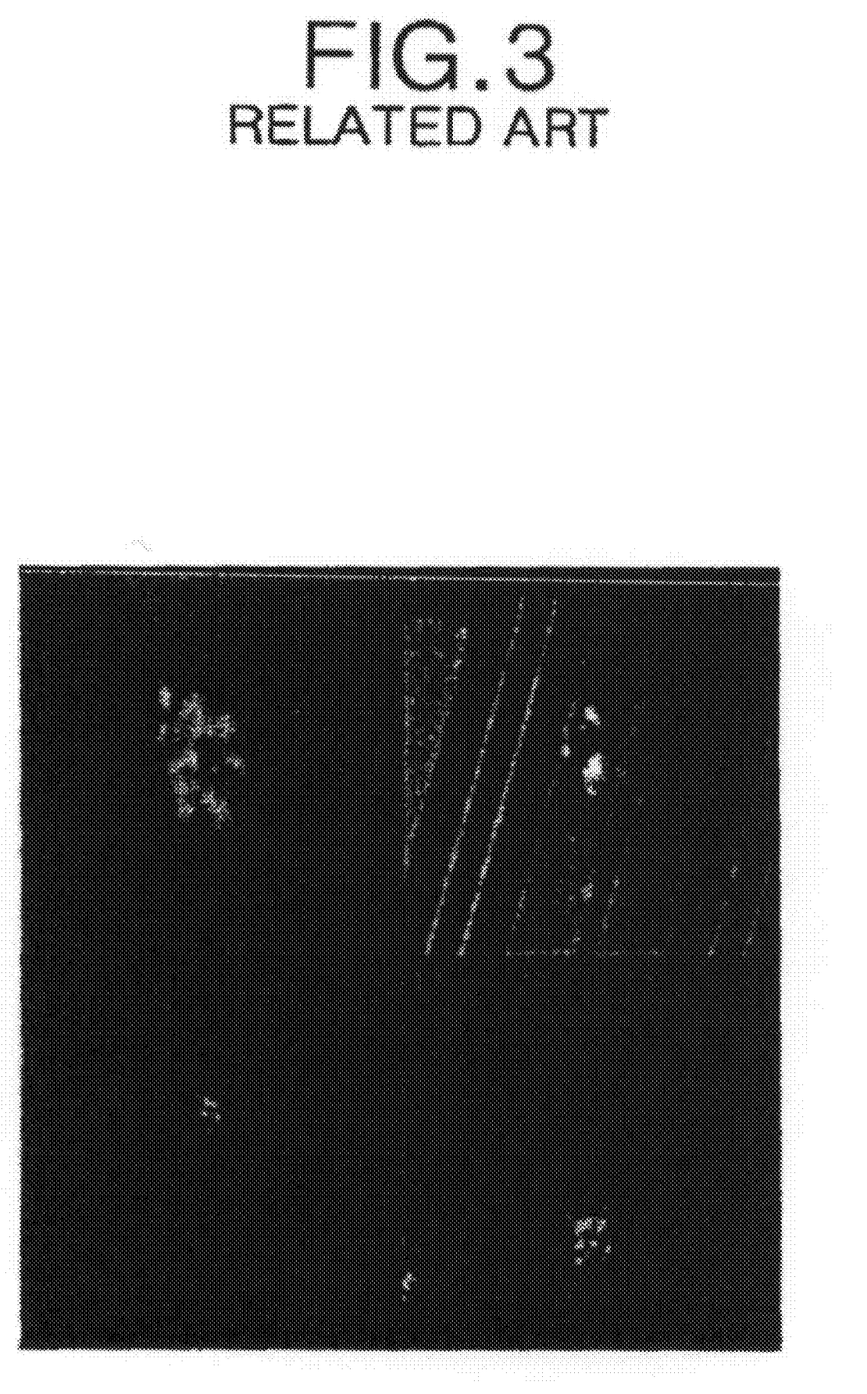
FIG. 3 is a photo representing a bright point caused by the particle upon realizing a picture.

FIG. 2 is a sectional view for explaining an alignment defect caused by airborne particles, and FIG. 3 is a photo representing a bright point caused by the particle upon realizing a picture.

Generally, in processes of manufacturing a liquid crystal display panel, it is possible for particles to settle between their films. For example, particles may settle on the panel in the chamber within which a designated thin film is formed, or if the panel is moved to a separate chamber or a third location to form another thin film, while the panel is being moved. An example of a particle 55 between the common electrode 18 and the upper alignment film 8 is illustrated in FIG. 2. In this example the alignment film corresponding to the particle 55 is not uniformly rubbed in a rubbing process, thereby generating a non-uniform alignment area A. Further, a portion of the color filter is separated by a defect on the process upon forming the color filter. Such particles 55 intermixed between layers may occur frequently causing various problems in the LCD panel.

For example, the non-uniform alignment area A causes light leakage in the liquid crystal display panel, and such light leakage interferes with light transmittance of the liquid crystal material. The light leakage appears as a bright point in the liquid crystal display panel, as illustrated in FIG. 3. Generally, a dark point is an area appearing dark in case of realizing a high gray, and a bright point is an area appearing bright in case of realizing a low gray. Herein, human eyes are more sensitive to a bright point than a dark point, thus a stricter standard is provided for a bright point defect than a dark point defect when determining if a panel is good or bad. Accordingly, a method is required to minimize a defect rate of a panel caused by a generation of a bright point.

SUMMARY OF THE INVENTION

Accordingly, the present invention is directed to an apparatus and method for repairing a liquid crystal display panel, which is capable of improving a yield thereof by darkening a bright point to minimize a defect ratio thereof.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings. To achieve these and other advantages and in accordance with the purpose of the present invention, as embodied and broadly described, an apparatus for repairing a liquid crystal display device includes a repair film formed on any one of a first substrate and a second substrate; and a laser irradiating device to irradiate a laser to the repair film to darken a defect point in the liquid crystal display panel.

The repair film is a transparent organic film.

The repair film is a black matrix formed on the first substrate.

The repair film is a spacer formed between the first and the second substrates and including an opaque material.

The apparatus further comprising a thin film transistor and a pixel electrode connected to the thin film transistor on the second substrate.

The apparatus further comprising a common electrode formed on the second substrate with the pixel electrode.

The apparatus further comprising a common electrode formed on the first substrate.

In another aspect of the present invention, an apparatus for repairing a liquid crystal display device includes a transparent organic film formed on any one of a first substrate and a second substrate to react to light; and a laser irradiating device to irradiate a laser to the transparent organic film to darken a specific area of the transparent organic film in the liquid crystal display panel.

The transparent organic film contains a photo active compound.

The transparent organic film comprises any one of a novolac system organic material with a photo active compound and an acryl system organic material with the photo active compound.

The apparatus further comprising a focus controller located between the liquid crystal display panel and the laser irradiating device to adjust an irradiation area of the laser and a focus distance.

The focus controller includes at least one of a lens and a mirror.

In another aspect of the present invention, an apparatus for repairing a liquid crystal display device, comprising: a first substrate having a black matrix and a second substrate facing to the first substrate with a liquid crystal layer therebetween; and a laser irradiating device to irradiate a laser to the black matrix near to a defect area in the liquid crystal display panel to extend the black matrix to the defect area.

The black matrix includes a polyimide mixed with a pigment of carbon system.

The laser irradiating device irradiates the laser to the black matrix and moves the laser to the defect area.

In another aspect of the present invention, an apparatus for repairing a liquid crystal display device includes a first substrate and a second substrate and a spacer formed between the first and the second substrates and including an opaque material; and a laser irradiating device to irradiate a laser to the spacer near to a defect area in the liquid crystal display panel to extend the spacer to the defect area.

The opaque material includes an acryl system material with at least one of a carbon and a metallic oxide.

The laser irradiating device irradiates the laser to the spacer and moves the laser to the defect area.

The spacer includes at least one of a pattern spacer and a ball spacer.

In another aspect of the present invention, a method for repairing a liquid crystal display device includes forming a transparent organic film on any one of a first substrate and a second substrate; sensing a defect area in the liquid crystal display panel; and irradiating a laser to an area of the transparent organic film corresponding to the defect area.

The method further comprising adjusting an irradiation area of the laser and a focus distance by using a focus controller.

In another aspect of the present invention, a method for repairing a liquid crystal display device includes forming a black matrix on a substrate; sensing a defect area in the liquid crystal display panel; and irradiating a laser to the black matrix near to the defect area.

Irradiating a laser to the black matrix near to the defect includes irradiating the laser to the black matrix; and moving the laser to the defect area.

In another aspect of the present invention, A method for repairing a liquid crystal display device includes forming a spacer between a first and a second substrates and including an opaque material; sensing an defect area in the liquid crystal display panel; irradiating a laser to the spacer near to the defect area.

Irradiating a laser to the spacer near to the defect area includes: irradiating the laser to the spacer; and moving the laser to the defect area.

In yet another aspect of the present invention, a liquid crystal display device includes a transparent organic film formed on any one of a first substrate and a second substrate; wherein the transparent organic film includes at least one darkened area.

In yet another aspect of the present invention, a liquid crystal display device includes a black matrix on a substrate, wherein the black matrix includes at least one extended area corresponded to a defect area.

In yet another aspect of the present invention, a liquid crystal display device includes a spacer formed between a first substrate and a second substrates and including an opaque material; wherein the spacer includes at least one extended area corresponded to a defect area.

In yet another aspect of the present invention, a liquid crystal display device includes a repair film formed on any one of a first substrate and a second substrate; wherein the repair film has at least one of a darkened area corresponding a defect area.

The device further comprising a first and second substrate; and a thin film transistor and a pixel electrode connected to the thin film transistor on the second substrate.

The device further comprising a common electrode formed on the second substrate with the pixel electrode.

The device further comprising a common electrode formed on the first substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Hereinafter, the embodiments of the present invention will be described in detail with reference to FIGS. 4 to 12.

Figure 4:
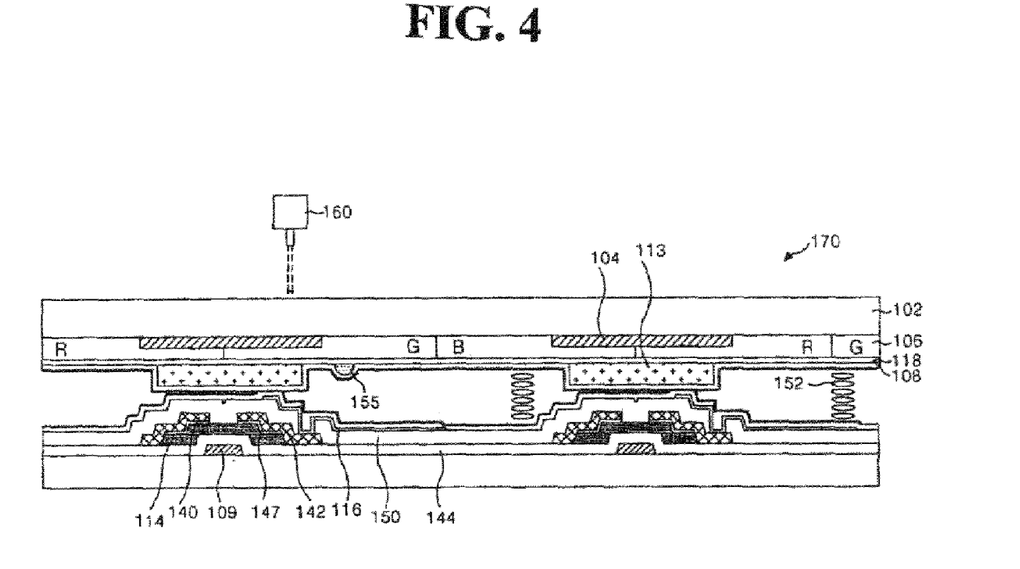
FIG. 4 is a sectional view illustrating an apparatus for repairing a liquid crystal display panel according to a first embodiment of the present invention.

FIG. 4 is a sectional view illustrating an apparatus for repairing a liquid crystal display panel according to a first embodiment of the present invention.

Referring to FIG. 4, an apparatus for repairing a liquid crystal display panel according to the first embodiment of the present invention includes a liquid crystal display panel 170 having a repair film (hereinafter, referred to as "transparent organic film") 120. The transparent organic film 120 may be used to darken an area where there is a bright point on the liquid crystal display panel 170 caused by an alignment defect resulting from a particle 155 intermixed in the liquid crystal display panel 170. The apparatus further includes a laser irradiating device 160 to irradiate a laser to the transparent organic film 120 to darken the transparent organic film 120 in an area corresponding to a bright point.

The liquid crystal display panel 170 includes an upper array substrate (or a color filter array substrate) having a black matrix 104, a color filter 106, a common electrode 118, a pattern spacer 113, and an upper alignment film 108 that are sequentially formed on an upper substrate 102; a lower array substrate having a thin film transistor (hereinafter, referred to as "TFT"), a pixel electrode 116 and a lower alignment film 138 that are formed on a lower substrate 132; and a liquid crystal material 152 in a space between the upper array substrate and the lower-array substrate.

The transparent organic film 120 is coated on an entire surface of the upper substrate 102 so that it substantially covers the upper substrate 102. The black matrix 104 is formed in an area corresponding to an area of gate lines and data lines (not shown) and a TFT area of the lower array substrate, and it defines a cell area where a color filter 106 is to be formed. The black matrix 104 may be formed of polyimide, in which a pigment of carbon system is mixed, to prevent light leakage and to absorb external light, thereby increasing contrast. The color filter 106 extends to the black matrix 104 and the cell area divided by the black matrix 104. The color filter 106 includes Red, Green and Blue to realize R, G and B colors. A common voltage is supplied to the common electrode 118 to control the movement of the liquid crystal material. The pattern spacer 113 maintains a cell gap between the upper array substrate and the lower array substrate.

The transparent organic film 120 according to the present invention is formed by adding a photo active compound to any one of a novolac system organic material and an acryl system organic material, so that darkening by a laser can be possible.

The TFT includes a gate electrode 109 formed on the lower substrate 132 along with a gate line; semiconductor layers 114, 147 overlapping the gate electrode 109 with a gate insulating film 144 therebetween; and source/drain electrodes 140, 142 formed together with a data line (not shown) with the semiconductor layers 114, 147 therebetween. The TFT supplies a pixel signal to a pixel electrode 116 from the data line in response to a scan signal from the gate line.

The pixel electrode 116 is in contact with a drain electrode 142 of the TFT with a passivation film 150 therebetween, wherein the pixel electrode 116 is formed of a transparent conductive material with high light transmittance. The upper and the lower alignment films 108 and 138 for aligning the liquid crystal material are formed by applying an alignment material such as polyimide and performing a rubbing process. On the other hand, the IPS mode liquid crystal display panel has the common electrode 118 formed on the lower substrate 132 and an overcoat layer (not shown) formed on the color filter 106 of the upper substrate 102, wherein the overcoat layer is for compensating the step difference of the color filter 106.

Figure 5:
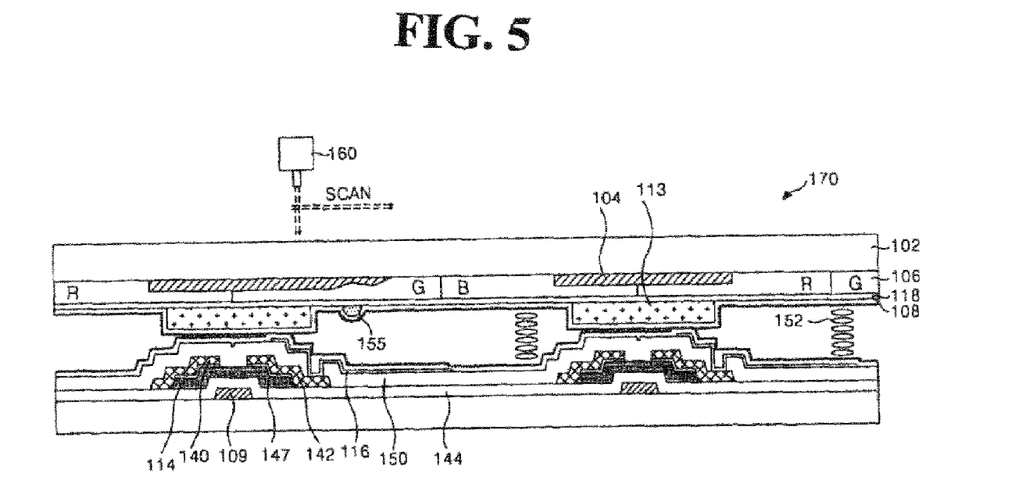
FIG. 5 is a sectional view illustrating a method of repairing the liquid crystal display panel according to the first embodiment of the present invention.

The laser irradiating device 160 irradiates a laser to the transparent organic film 120 in an area corresponding to a bright point in the liquid crystal display panel 170 caused by an alignment defect, such as a particle 155 trapped after combining the upper array substrate to the lower array substrate. For instance, as illustrated in FIG. 5, when there is a bright point in the liquid crystal display panel 170, the laser irradiating device 160 irradiates a laser to the transparent organic film in an area corresponding to the bright point.

Herein, the laser irradiating device 160 may further include a focus controller 162. The laser can be accurately adjusted to an irradiation area using the focus controller 162 located between the laser irradiating device 10 and the liquid crystal display panel 170.

In this case, the laser of the laser irradiating device 160 is irradiated to the transparent organic film 120 with a strong energy of about 0.1 J/cm$^2$ to 2 J/cm$^2$. And, the transparent organic film 120, to which the photo active compound has been added, reacts to light, so that characteristics of the transparent organic film 120 change and the transparent organic film 120 darkens or becomes substantially opaque. As a result, the area of the liquid crystal display panel corresponding to the particle 155 is darkened.

In this way, a bright point caused by the alignment defect is darkened to minimize a defect ratio of the liquid crystal display panel. Accordingly, a yield of the liquid crystal display panel is improved.

Herein, the laser irradiating device 160 may be at least one of an Nd yttrium aluminum garnet YAG laser, an eximer laser, and a diode laser. The Nd yttrium aluminum garnet YAG laser is a laser that oscillates by using a neodymium Nd solid and a YAG crystal as an amplification medium. In the eximer laser a molecule in an excitation state (that is, an eximer made from both an excitation state and an atom of a ground state) generates light and then enters a dissociation state. The diode laser is a laser that oscillates using the light generated upon the energy level change or the carrier movement of the joining part of an n-type semiconductor and a p-type semiconductor.

The Nd YAG laser has wavelengths of about 330 nm~340 nm, about 530 nm~540 nm, and about 1060 nm~1070 nm; the eximer laser has a wavelength of about 190 nm~200 nm; and the diode laser has a wavelength of about 100 nm~1000 nm.

Further, a laser generated by each of CO, $CO_2$, He—Ne, and HF may be used. The CO laser has a wavelength of about 4900 nm~5100 nm, the $CO_2$ laser has a wavelength of about 100 nm~110 nm, the He—Ne laser has a wavelength of about 630 nm~640 nm, and the HF laser has a wavelength of about 2700 nm~2900 nm.

As described above, in the apparatus of repairing the liquid crystal display panel according to the first embodiment of the present invention, the laser is irradiated to the transparent organic film 120 in the area corresponding to the area where the bright point is caused by an alignment defect to darken the area where the bright point is generated. Thus, light radiated from a backlight does not pass through the LCD panel where the defect occurs. As a result, it is possible to reduce generation of a bright point. Accordingly, it is possible to minimize a defect ratio of the liquid crystal display panel and to improve a yield of the liquid crystal display panel.

In the description according to the first embodiment of the present invention, the transparent organic film 120 is formed on the upper substrate 102, but the transparent organic film 120 may be formed on the lower substrate 132 instead of or in addition to the transparent organic film on the upper substrate. Because a case that the transparent organic film 120 is formed on the lower substrate 132 is substantially the same as the case that the transparent organic film 120 is formed on the upper substrate 102, a description of the transparent organic film 120 on the lower substrate 132 will be omitted.

Figure 6:
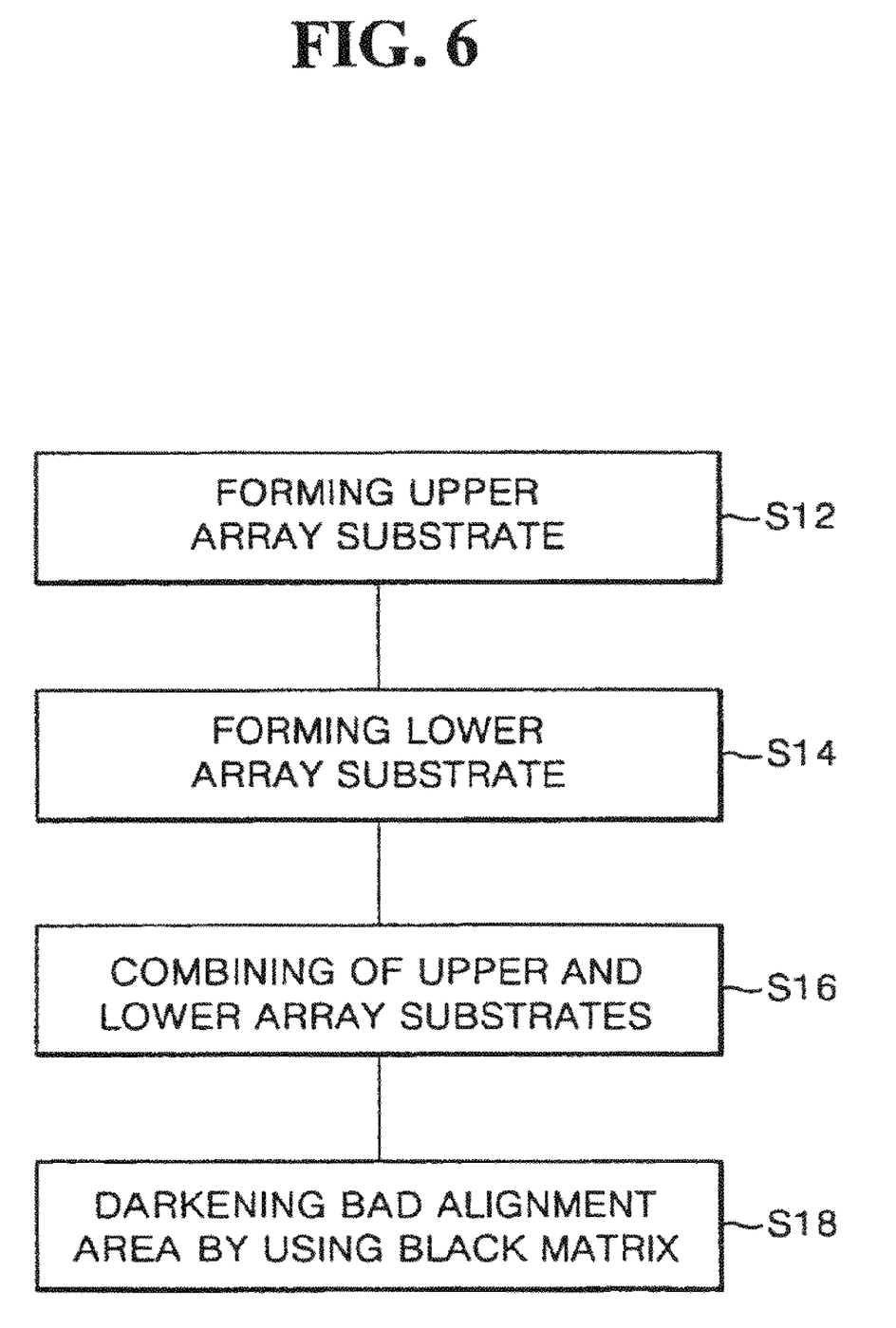
FIG. 6 is a flow chart for explaining the method of repairing the liquid crystal display panel according to the first embodiment of the present invention.

FIG. 6 is a flow chart for explaining the method of repairing the liquid crystal display panel according to the first embodiment of the present invention.

Referring to FIG. 6, the upper array substrate (or, a color filter array substrate) having the black matrix 104, the color filter 106, the common electrode 118, the pattern spacer 113 and the upper alignment film 108, which are sequentially formed on the upper substrate 102, is formed (S2).

Further, the lower array substrate having the gate line and the data line, the thin film transistor which is formed at the crossing of the gate line and the data line, the pixel electrode 116 connected to the thin film transistor, and the lower alignment film 138, which are formed on the lower substrate 132, is formed by a separate process (S4). On the other hand, in case of the liquid crystal display panel of IPS mode, the common electrode 118 is formed on the lower substrate 132 and an overcoat layer is formed on the color filter 106 of the upper substrate 102.

After this, the upper substrate and the lower substrate are bonded together and the liquid crystal is provided therebetween to form the liquid crystal display panel (S6).

Thereafter, when the particle 155 inserted between a thin film and a thin film of the upper substrate, e.g., between the common electrode 118 and the upper alignment film 108, causes a bright point, the laser is irradiated to the transparent organic film 120 in an area corresponding to the bright point to make the transparent organic film 120 of that corresponding area substantially opaque. Accordingly, the bright point is essentially darkened (S8).

In this case, the transparent organic film is formed by adding a photo active compound to any one of a novolac system organic material and an acryl system organic material, so that darkening by a laser can be possible.

Accordingly, the bright point caused by an alignment defect is darkened to minimize a defect ratio of the liquid crystal display panel. Thus, it is possible improve a yield of the liquid crystal display panel.

In this way, the method in which the laser is irradiated to the transparent organic film 120 to darken the area where the bright point is generated can be easily applied to the liquid crystal display panel of electrical controlled birefringence (ECB), further vertical alignment (VA) mode, as well as to the liquid crystal display panel of IPS mode and the liquid crystal display panel of TN mode.

Figure 7:
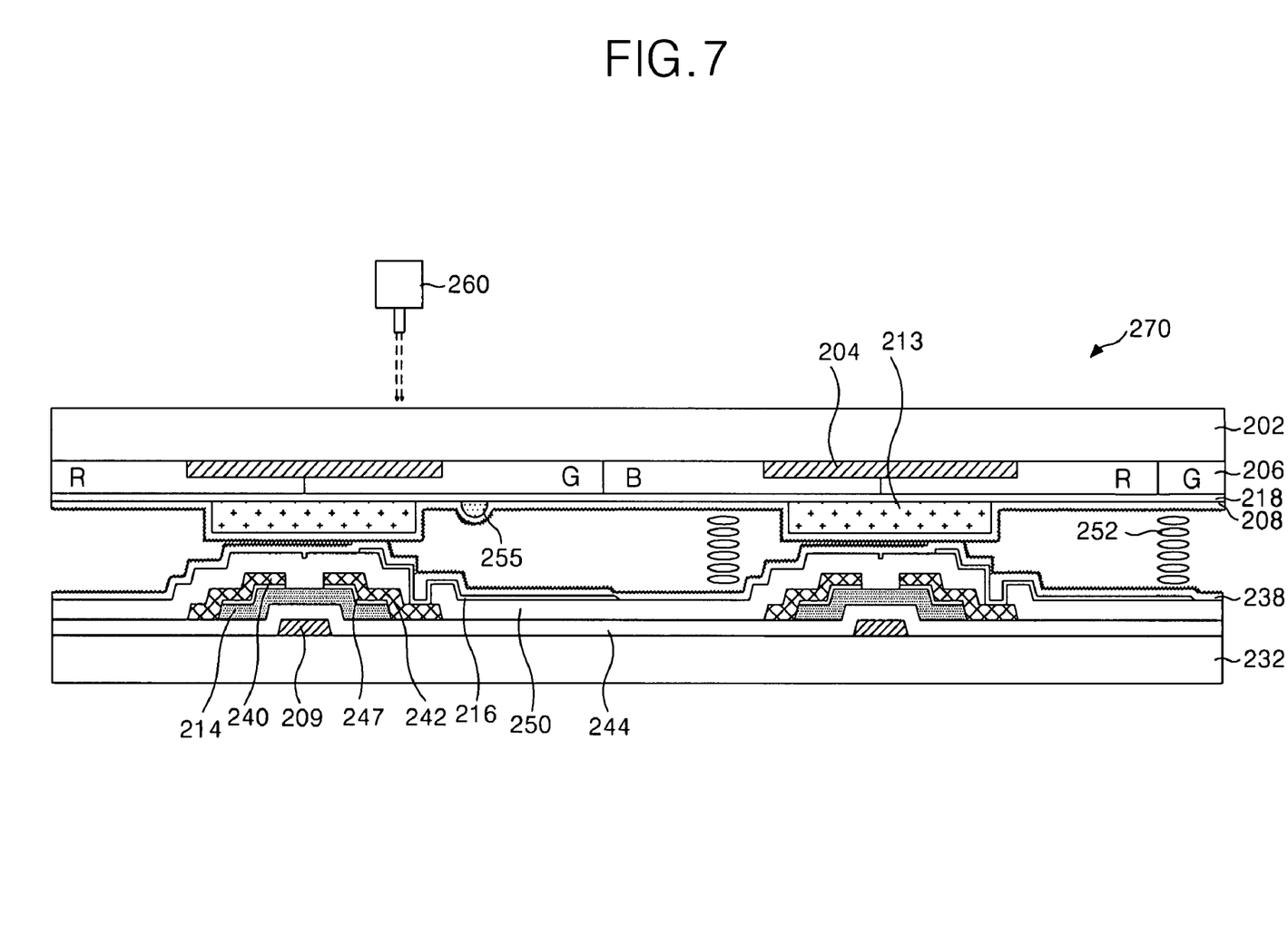
FIG. 7 is a sectional view illustrating an apparatus for repairing a liquid crystal display panel according to a second embodiment of the present invention.

FIG. 7 is a sectional view illustrating an apparatus for repairing a liquid crystal display panel according to a second embodiment of the present invention.

Referring to FIG. 7, an apparatus for repairing a liquid crystal display panel according to the second embodiment of the present invention includes a laser irradiating device 260, which irradiates a laser to a black matrix 204 of an area near to the area where a bright point is generated to darken the area where a particle 255 is intermixed.

The liquid crystal display panel 270 includes an upper array substrate (or a color filter array substrate) having a black matrix 204, a color filter 206, a common electrode 218, a pattern spacer 213, and an upper alignment film 208 that are sequentially formed on an upper substrate 202; a lower array substrate having a thin film transistor (hereinafter, referred to as "TFT"), a pixel electrode 216 and a lower alignment film 238 that are formed on a lower substrate 232; and a liquid crystal material 252 in a space between the upper array substrate and the lower array substrate.

In the upper array substrate, the black matrix 204 is formed on the upper substrate 202 in an area corresponding to an area of gate lines and data lines (not shown) and the TFT area of the lower array substrate. The black matrix provides a cell area where a color filter 206 is to be formed. The black matrix 204 may be formed of polyimide, in which a pigment of carbon system is mixed, to prevent light leakage and to absorb external light, thereby acting to increase contrast. The color filter 206 extends to the black matrix 204 and the cell area divided by the black matrix 204. The color filter 206 is formed by Red, Green and Blue to realize R, G and B colors. A common voltage is supplied to the common electrode 218 to control the movement of the liquid crystal material. The pattern spacer 213 maintains a cell gap between the upper array substrate and the lower array substrate.

On the lower array substrate, the TFT includes a gate electrode 209 formed on the lower substrate 232 along with a gate line; semiconductor layers 214, 247 overlapping the gate electrode 209 with a gate insulating film 244 therebetween; and source/drain electrodes 240, 242 formed together with a data line (not shown) with the semiconductor layers 214, 247 therebetween. The TFT supplies a pixel signal to a pixel electrode 216 from the data line in response to a scan signal from the gate line.

The pixel electrode 216 is in contact with a drain electrode 242 of the TFT with a passivation film 250 therebetween, wherein the passivation film 250 is formed of a transparent conductive material with high light transmittance. The upper and the lower alignment films 208 and 238 for aligning the liquid crystal material are formed by applying an alignment material such as polyimide and performing a rubbing process. On the other hand, the IPS mode liquid crystal display panel has the common electrode 218 formed on the lower substrate 232 and an overcoat layer (not shown) formed on the color filter 206 of the upper substrate 202, wherein the overcoat layer is for compensating the step difference of the color filter 206.

Figure 8:
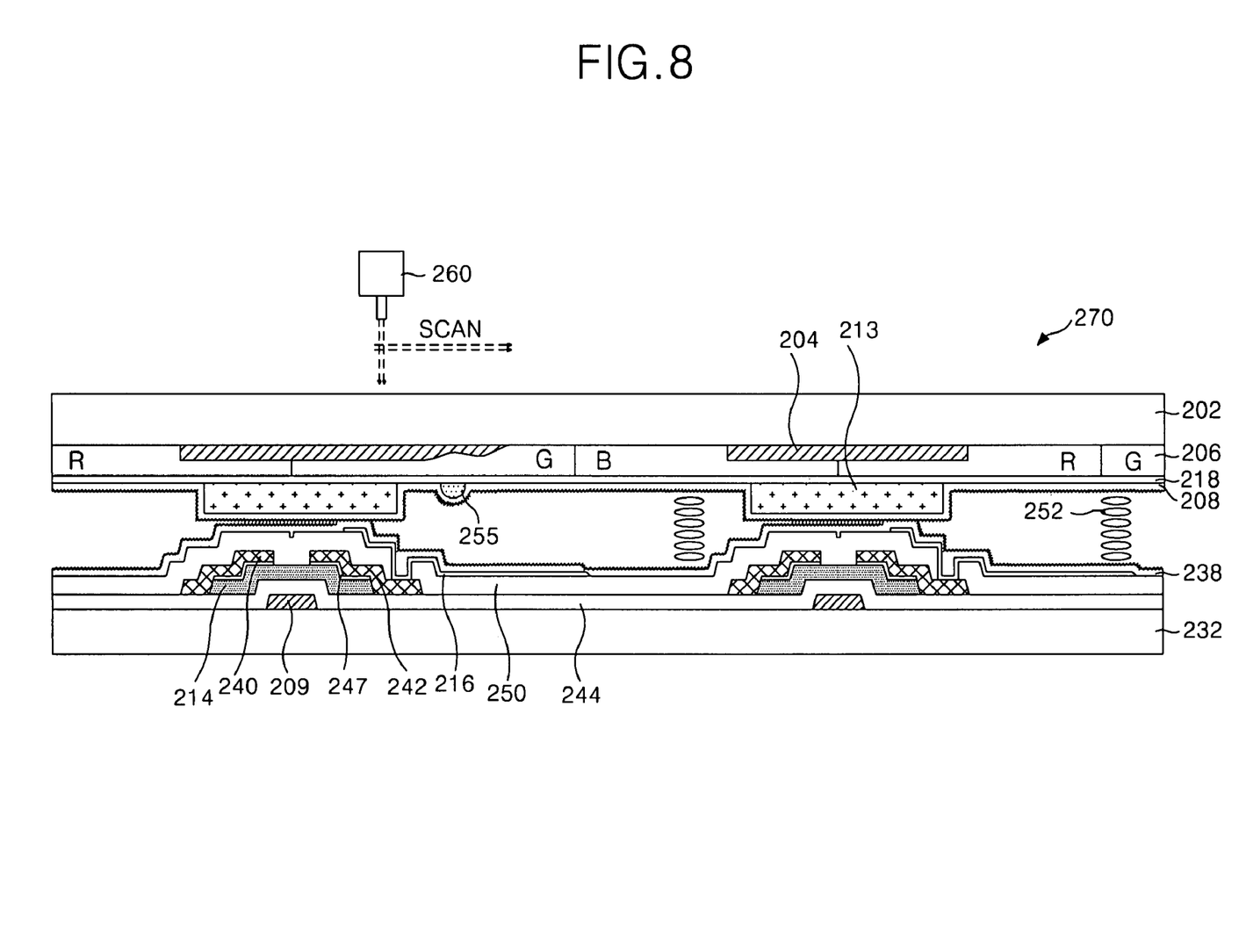
FIG. 8 is a sectional view illustrating a method of repairing the liquid crystal display panel according to the second embodiment of the present invention.

The laser irradiating device 260 irradiates a laser to the black matrix near to an area where there is a bright point generated in the liquid crystal display panel 270 by an alignment defect such as a particle 255 trapped after combining the upper array substrate to the lower array substrate. For instance, as illustrated in FIG. 8, when there is a bright point in the liquid crystal display panel 270, the laser irradiating device 260 irradiates a laser to the black matrix 204 near to the area of the bright point.

The laser of the laser irradiating device 260 is irradiated to the black matrix 204 with a strong energy of about 0.1 J/cm$^2$ to 2 J/cm$^2$. Accordingly, characteristics of the black matrix 204 are changed due to the strong energy, so that the black matrix 204 becomes moveable. In other words, the black matrix 204 is melted by the strong energy. And at this time, if the laser is moved from the black matrix 204 to the area where the bright point is generated, then the melted black matrix 204 moves to the area where the bright point is generated. Accordingly, the area of the bright point is darkened.

In this way, the bright point caused by the alignment defect is darkened to minimize a defect ratio of the liquid crystal display panel. Accordingly, a yield of the liquid crystal display panel is improved.

Herein, the laser irradiating device 160 may be at least one of an Nd yttrium aluminum garnet YAG laser, an eximer laser, and a diode laser. The Nd yttrium aluminum garnet YAG laser is a laser that oscillates by using a neodymium Nd solid and a YAG crystal as an amplification medium. In the eximer laser a molecule in an excitation state (that is, an eximer made from both an excitation state and an atom of a ground state) generates light and then enters a dissociation state. The diode laser is a laser that oscillates using the light generated upon the energy level change or the carrier movement of the joining part of an n-type semiconductor and a p-type semiconductor.

The Nd YAG laser has wavelengths of about 330 nm~340 nm, about 530 nm~540 nm, and about 1060 nm~1070 nm; the eximer laser has a wavelength of about 190 nm~200 nm; and the diode laser has a wavelength of about 100 nm~1000 nm.

Further, a laser generated by each of CO, $CO_2$, He—Ne, and HF may be used. The CO laser has a wavelength of about 4900 nm~5100 nm, the $CO_2$ laser has a wavelength of about 100 nm~110 nm, the He—Ne laser has a wavelength of about 630 nm~640 nm, and the HF laser has a wavelength of about 2700 nm~2900 nm.

As described above, in the apparatus for repairing the liquid crystal display panel according to the second embodiment of the present invention, the laser is irradiated to the black matrix 204 in the area near to where there is a bright point in the liquid crystal display panel 270 caused by an alignment defect such as the particle 255 to darken the area corresponding to the bright point. Thus, the black matrix 204 is extended to the area where there is a bright point to darken the bright point. As a result, light radiated from a backlight does not pass through the LCD panel where the defect occurs. Accordingly, it is possible to reduce a generation of a bright point. Thus, it is possible to minimize a defect ratio of the liquid crystal display panel and to improve a yield of the liquid crystal display panel.

Figure 9:
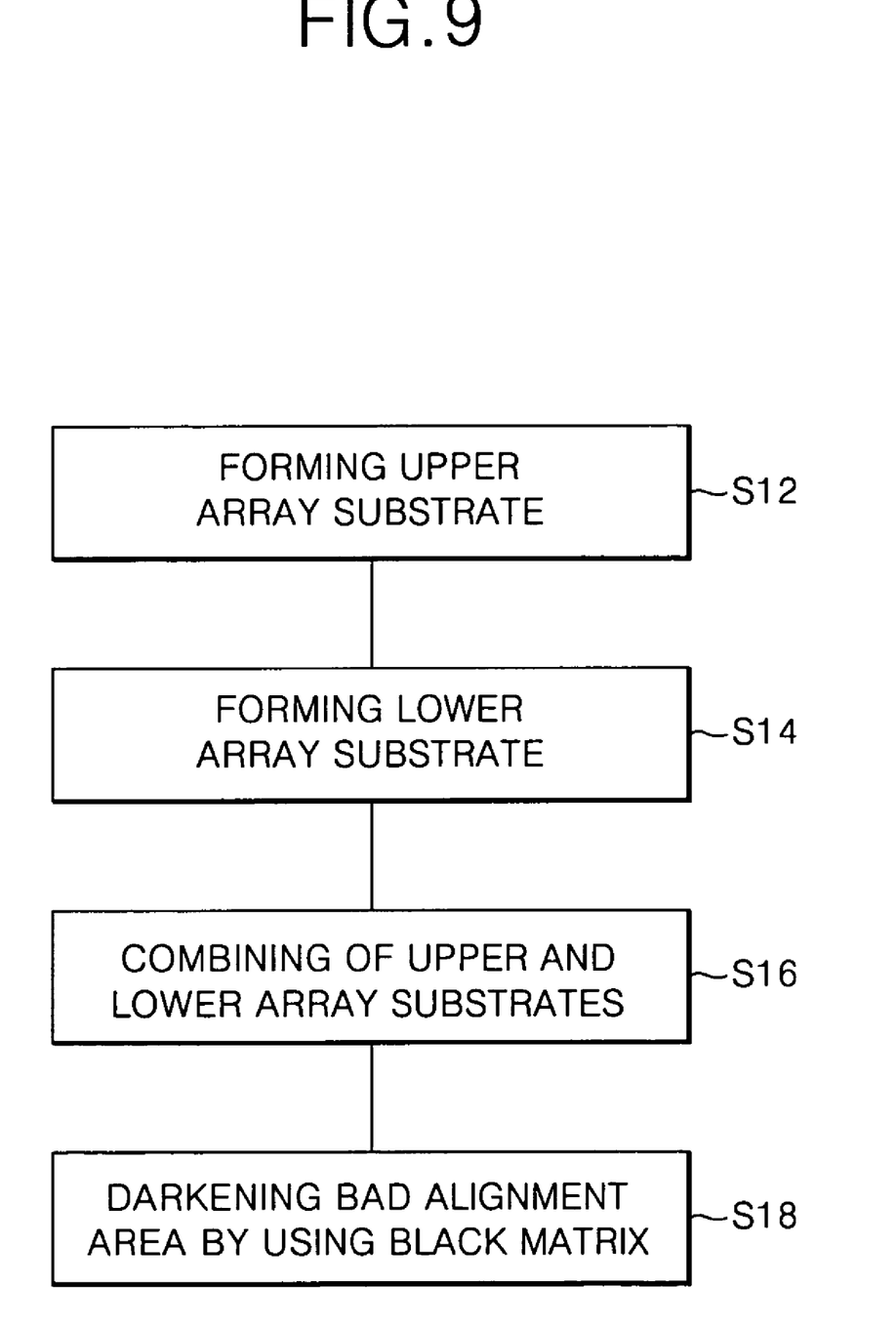
FIG. 9 is a flow chart for explaining the method of repairing the liquid crystal display panel according to the second embodiment of the present invention.

FIG. 9 is a flow chart for explaining the method of repairing the liquid crystal display panel according to the second embodiment of the present invention.

Referring to FIG. 9, the upper array substrate (or, a color filter array substrate) having the black matrix 204, the color filter 206, the common electrode 218, the pattern spacer 213 and the upper alignment film 208, which are sequentially formed on the upper substrate 202, is formed (S12).

Further, the lower array substrate having the gate line and the data line, the thin film transistor that is formed at the crossing of the gate line and the data line, the pixel electrode 216 connected to the thin film transistor, and the lower alignment film 238, which are formed on the lower substrate 232, is formed by a separate process (S14). On the other hand, in case of the liquid crystal display panel of IPS mode, the common electrode 218 is formed on the lower substrate 232 and an overcoat layer is formed on the color filter 206 of the upper substrate 202.

After this, the upper substrate and the lower substrate are bonded together and the liquid crystal is provided therebetween to form the liquid crystal display panel (S16).

Thereafter, when the particle 255 inserted between a thin film and a thin film of the upper substrate, e.g., between the common electrode 218 and the upper alignment film 208, causes a bright point, the laser is irradiated to the black matrix 204 of the area near to the area where the bright point is generated to melt the black matrix 204. In this case, the laser irradiating device 260 scans its laser in order to move the black matrix 204, which is melted to the area where the bright point is generated. Accordingly, the bright point is darkened (S18).

The black matrix 204 may be formed of polyimide, in which a pigment of carbon system is mixed, and extends to the bright point to intercept light irradiated from the back light. Thus, the bright point is darkened. As a result, the bright point caused by an alignment defect is darkened to minimize a defect ratio of the liquid crystal display panel. Accordingly, it is possible improve a yield of the liquid crystal display panel.

In this way, the method, in which the laser is irradiated to the black matrix 204 to darken the area where the bright point is generated can be easily applied to the liquid crystal display panel of electrical controlled birefringence (ECB), further vertical alignment (VA) mode, as well as to the liquid crystal display panel of IPS mode and the liquid crystal display panel of TN mode.

Figure 10:
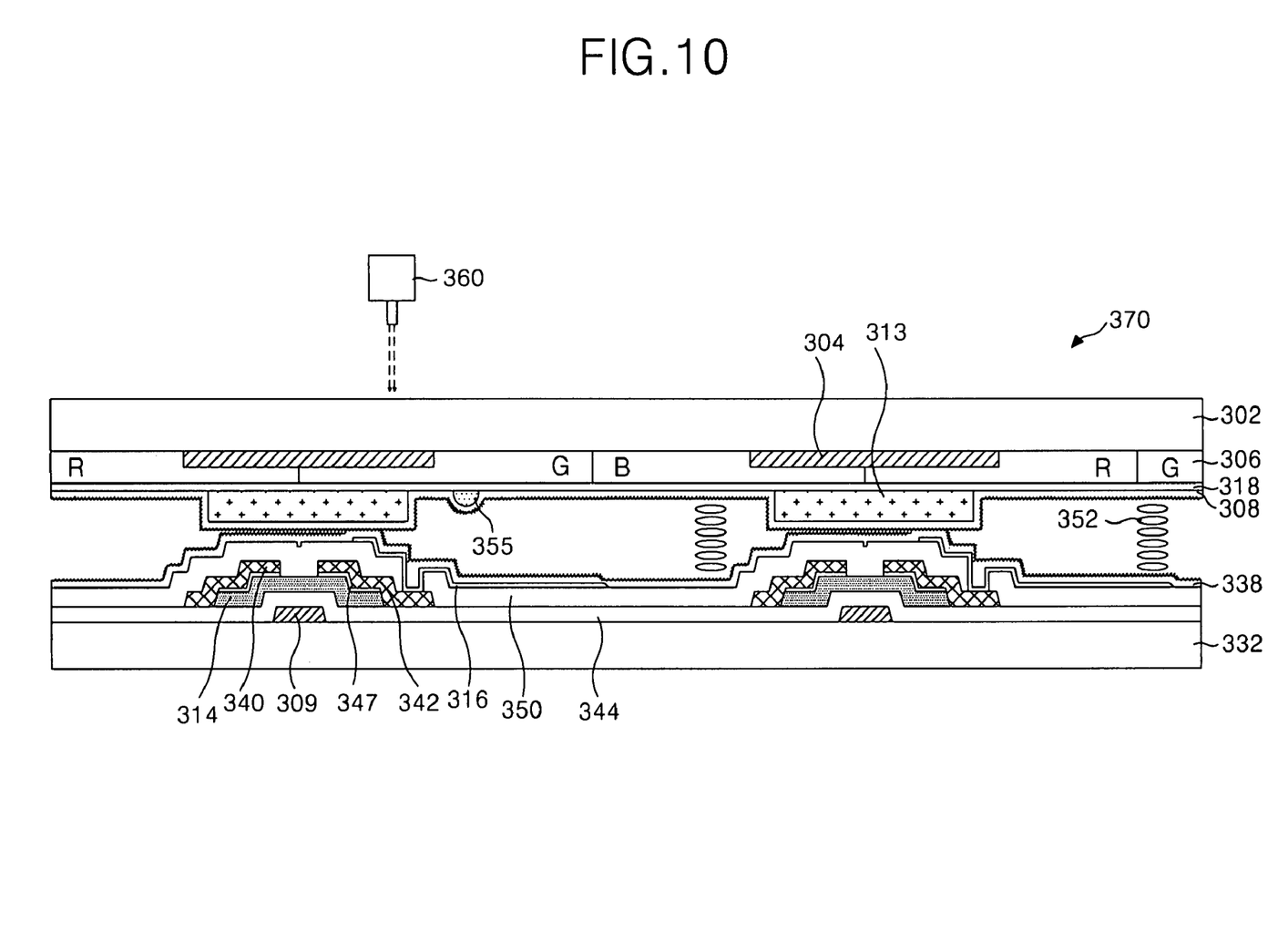
FIG. 10 is a sectional view illustrating an apparatus for repairing a liquid crystal display panel according to a third embodiment of the present invention.

FIG. 10 is a sectional view illustrating an apparatus for repairing a liquid crystal display panel according to a third embodiment of the present invention.

Referring to FIG. 10, an apparatus for repairing a liquid crystal display panel according to the third embodiment of the present invention includes a laser irradiating device 360, which irradiates a laser to a pattern spacer 313 of an area near to the area where a bright point is generated to darken the area where a particle 355 is intermixed.

The liquid crystal display panel 370 includes an upper array substrate (or a color filter array substrate) having a black matrix 304, a color filter 306, a common electrode 318, a pattern spacer 313, and an upper alignment film 308 which are sequentially formed on an upper substrate 302; a lower array substrate having a thin film transistor (hereinafter, referred to as "TFT"), a pixel electrode 316 and a lower alignment film 338 which are formed on a lower substrate 332; and a liquid crystal material 352 in a space between the upper array substrate and the lower array substrate.

On the upper array substrate, the black matrix 304 is formed on the upper substrate 302 in an area corresponding to an area corresponding to an area of gate lines and data lines (not shown) and the TFT area of the lower array substrate. The black matrix provides a cell area where a color filter 306 is to be formed. The black matrix 304 prevents light leakage and absorbs external light, thereby increasing contrast. The color filter 306 extends to the black matrix 304 and the cell area divided by the black matrix 304. The color filter 306 is formed by Red, Greed and Blue to realize R, G and B colors. A common voltage is supplied to the common electrode 318 to control the movement of the liquid crystal material. The pattern spacer 313 acts to keep a cell gap between the upper array substrate and the lower array substrate.

Herein, the pattern spacer 313 of the present invention is formed of an opaque material, which is formed by adding any one of carbon and metallic oxide to an acryl system material.

In the lower array substrate, the TFT includes a gate electrode 309 formed on the lower substrate 332 along with a gate line; semiconductor layers 314, 347 overlapping the gate electrode 309 with a gate insulating film 344 therebetween; and source/drain electrodes 340, 342 formed together with a data line (not shown) with the semiconductor layers 314, 347 therebetween. The TFT supplies a pixel signal to a pixel electrode 316 from the data line in response to a scan signal from the gate line.

The pixel electrode 316 is in contact with a drain electrode 342 of the TFT with a passivation film 350 therebetween, wherein the passivation film 350 is formed of a transparent conductive material with high light transmittance. The upper and the lower alignment films 308 and 338 for aligning the liquid crystal material are formed by applying an alignment material such as polyimide and performing a rubbing process. On the other hand, the IPS mode liquid crystal display panel has the common electrode 318 formed on the lower substrate 332 and an overcoat layer (not shown) formed on the color filter 306 of the upper substrate 302, wherein the overcoat layer is for compensating the step difference of the color filter 306.

Figure 11:
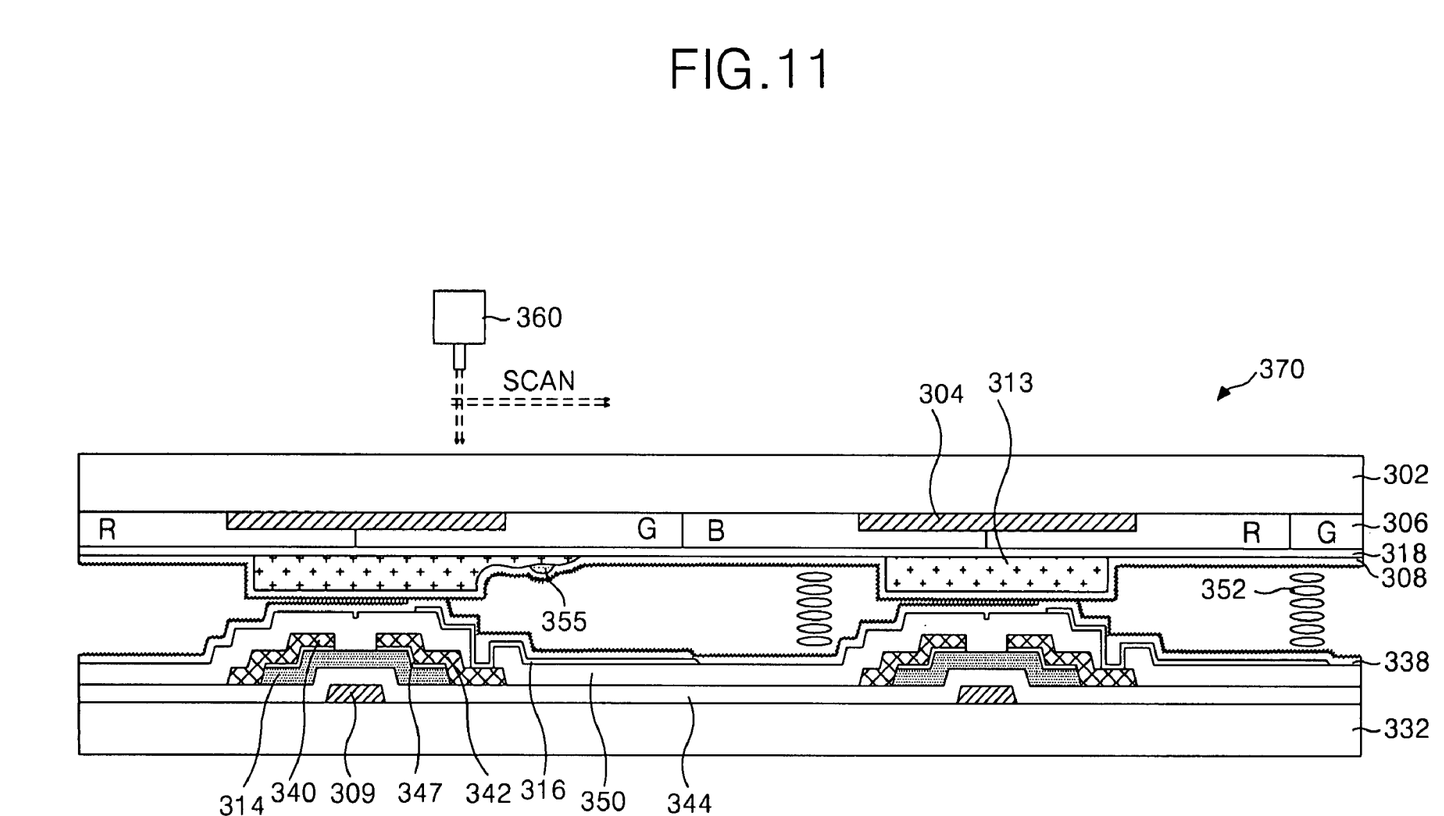
FIG. 11 is a sectional view illustrating a method of repairing the liquid crystal display panel according to the third embodiment of the present invention.

The laser irradiating device 360 irradiates a laser to the pattern spacer 313 near to an area where there is a bright point in the liquid crystal display panel 370 caused by an alignment defect such as the particle 355 trapped after combining the upper array substrate to the lower array substrate. For instance, as illustrated in FIG. 11, when there is a bright point in the liquid crystal display panel 370, the laser irradiating device 360 irradiates a laser to the pattern spacer 313 near to the area of the bright point.

The laser of the laser irradiating device 360 is irradiated to the pattern spacer 313 with a strong energy of about 0.1 J/cm$^2$ to 2 J/cm$^2$. Accordingly, characteristics of the pattern spacer 313 change due to the strong energy, so that the pattern spacer 313 becomes moveable. In other words, the pattern spacer 313 is melted by the strong energy. And at this time, if the laser is moved from the pattern spacer 313 to the area where the bright point is generated, then the melted pattern spacer 313 moves to the area where the bright point is generated. Accordingly, the bright point is darkened.

In this way, the bright point caused by the alignment defect is darkened to minimize a defect ratio of the liquid crystal display panel. Accordingly, a yield of the liquid crystal display panel is improved.

Herein, the laser irradiating device 160 may be at least one of an Nd yttrium aluminum garnet YAG laser, an eximer laser, and a diode laser. The Nd yttrium aluminum garnet YAG laser is a laser that oscillates by using a neodymium Nd solid and a YAG crystal as an amplification medium. In the eximer laser a molecule in an excitation state (that is, an eximer made from both an excitation state and an atom of a ground state) generates light and then enters a dissociation state. The diode laser is a laser that oscillates using the light generated upon the energy level change or the carrier movement of the joining part of an n-type semiconductor and a p-type semiconductor.

The Nd YAG laser has wavelengths of about 330 nm~340 nm, about 530 nm~540 nm, and about 1060 nm~1070 nm, the eximer laser has a wavelength of about 190 nm~200 nm, and the diode laser has a wavelength of about 100 nm~1000 nm.

Further, a laser generated by each of CO, $CO_2$, He—Ne, and HF may be used. The CO laser has a wavelength of about 4900 nm~5100 nm, the $CO_2$ laser has a wavelength of about 100 nm~110 nm, the He—Ne laser has a wavelength of about 630 nm~640 nm, and the HF laser has a wavelength of about 2700 nm~2900 nm.

As described above, in the apparatus of repairing the liquid crystal display panel according to the third embodiment of the present invention, the laser is irradiated to the pattern spacer 313 in the area near to the area where there is a bright point in the liquid crystal display panel 370 caused by an alignment defect such as the particle 355 to darken the area corresponding to the bright point. Thus, the pattern spacer 313 is extended to the area where there is a bright point to darken the bright point. As a result, light radiated from a backlight does not pass through the LCD panel where the defect occurs. Accordingly, it is possible to reduce a generation of a bright point. Thus, it is possible to minimize a defect ratio of the liquid crystal display panel and to improve a yield of the liquid crystal display panel.

In the description referring to FIG. 11, only case of the pattern spacer 313 is described, but the principles of the present invention also apply when a ball spacer is used.

Figure 12:
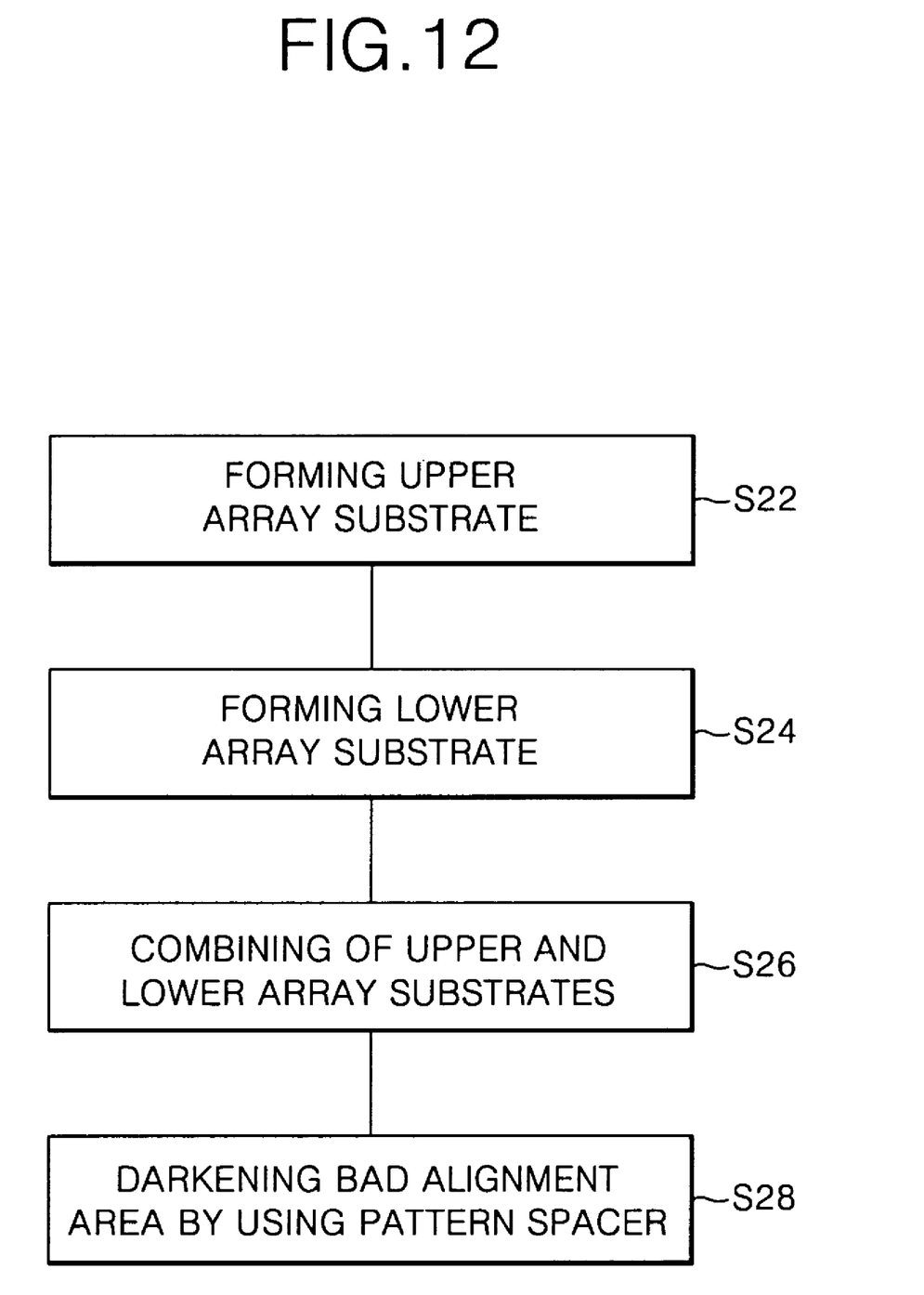
FIG. 12 is a flow chart for explaining the method of repairing the liquid crystal display panel according to the third embodiment of the present invention.

FIG. 12 is a flow chart for explaining the method of repairing the liquid crystal display panel according to the third embodiment of the present invention.

Referring to FIG. 12, the upper array substrate (or, a color filter array substrate) having the black matrix 304, the color filter 306, the common electrode 318, the pattern spacer 313 and the upper alignment film 308, which are sequentially formed on the upper substrate 302, is formed (S22).

Further, the lower array substrate having the gate line and the data line, the thin film transistor which is formed at the crossing of the gate line and the data line, the pixel electrode 316 connected to the thin film transistor, and the lower alignment film 338, which are formed on the lower substrate 332, is formed by a separate process (S24). On the other hand, in case of the liquid crystal display panel of IPS mode, the common electrode 318 is formed on the lower substrate 332 and an overcoat layer is formed on the color filter 306 of the upper substrate 302.

After this, the upper substrate and the lower substrate are bonded together and the liquid crystal is provided therebetween to form the liquid crystal display panel (S26).

Thereafter, when the particle 355 inserted between a thin film and a thin film of the upper substrate, e.g., between the common electrode 318 and the upper alignment film 308, causes a bright point, the laser is irradiated to the pattern spacer 313 of the area near to the area where the bright point is generated to melt the pattern spacer 313. In this case, the laser irradiating device 360 scans its laser in order to move the pattern spacer 313, which is melted to the area where the bright point is generated. Accordingly, the bright point is darkened (S28).

The pattern spacer 313 may be formed of acryl system material, to which any one of carbon and metallic oxide is added, and extends to the bright point to intercept light irradiated from the back light. Thus, the bright point is darkened. As a result, the bright point caused by an alignment defect is darkened to minimize a defect ratio of the liquid crystal display panel. Accordingly, it is possible improve a yield of the liquid crystal display panel.

In this way, the method, in which the laser is irradiated to the pattern spacer 313 to darken the area where the bright point is generated, can be easily applied to the liquid crystal display panel of electrical controlled birefiingence (ECB), further vertical alignment (VA) mode, as well as to the liquid crystal display panel of IPS mode and the liquid crystal display panel of TN mode.

As described above, in the apparatus and the method for repairing the liquid crystal display panel according to the embodiment of the present invention, the transparent organic film is formed on any one of the upper substrate and the lower substrate in a case that a bright point is generated in the liquid crystal display panel due to a problem in manufacturing the liquid crystal display panel. A laser is irradiated to the transparent organic film where the bright point is generated to thereby make the transparent organic film substantially opaque. As a result, the area where the bright point is generated is darkened. Accordingly, the bright point of the liquid crystal display panel is darkened to minimize a defect ratio of the liquid crystal display panel. Thus, it is possible to improve a yield of the liquid crystal display panel.

Further, in the case that the bright point is generated, the laser may be irradiated to the black matrix in the area near to the particle to melt the black matrix so that the melted black matrix is extended to the area where the bright point is generated to thereby darken the area. Accordingly, the bright point is darkened to minimize a defect ratio of the liquid crystal display panel. Thus, it is possible to improve a yield of the liquid crystal display panel.

Moreover, in the case that the bright point is generated, the laser may be irradiated to the pattern spacer in the area near to the particle to melt the pattern spacer so that the melted pattern spacer is extended to the area where the bright point is generated to thereby darken the area. Accordingly, the bright point is darkened to minimize a defect ratio of the liquid crystal display panel. Thus, it is possible to improve a yield of the liquid crystal display panel.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of manufacturing a liquid crystal display device, comprising:
   providing a first substrate and a second substrate;
   forming a data line and a gate line on the first substrate, the data line and the gate lines crossing each other;
   forming a thin film transistor at a crossing of the data and gate lines;
   forming a pixel electrode on the first substrate;
   forming a common electrode on one of the first and second substrates;
   forming a repair film on one of the first and second substrates, wherein the repair film is a black matrix;
   attaching the first and second substrates and providing a liquid crystal layer between the first and second substrates to form a liquid crystal display panel;
   testing the liquid crystal display panel to detect a bright point defect; and
   irradiating an area of the repair film corresponding the bright point defect using laser light to block light transmission through the bright point defect.

2. The method of claim 1, further comprising irradiating laser light onto the black matrix to extend the black matrix to correspond to a region having the bright point defect.

3. The method of claim 1, wherein the laser is irradiated at an energy of about 0.1 J/cm2 to about 2 J/cm2.

4. The method of claim 1, wherein the laser is an Nd yttrium aluminum garnet (YAG) laser having a wavelength of about 330 nm~340 nm.

5. The method of claim 1, wherein the laser is an Nd yttrium aluminum garnet (YAG) laser having a wavelength of about 530 nm~540 nm.

6. The method of claim 1, wherein the laser is an Nd yttrium aluminum garnet (YAG) laser having a wavelength of about 1060 nm~1070 nm.

7. The method of claim 1, wherein the laser is an eximer laser having a wavelength of about 190 nm~200 nm.

8. The method of claim 1, wherein the laser is a diode laser having a wavelength of about 100 nm~1000 nm.

9. The method of claim 1, wherein the laser is a CO laser having a wavelength of about 4900 nm~5100 nm.

10. The method of claim 1, wherein the laser is a CO2 laser having a wavelength of about 100 nm~110 nm.

11. The method of claim 1, wherein the laser is an He—NE laser having a wavelength of about 630 nm~640 nm.

12. The method of claim 1, wherein the laser is an HF laser having a wavelength of about 2700 nm~2900 nm.

13. A method of manufacturing a liquid crystal display device, comprising:
   providing a first substrate and a second substrate;
   forming a data line and a gate line on the first substrate, the data line and the gate lines crossing each other;
   forming a thin film transistor at a crossing of the data and gate lines;
   forming a pixel electrode on the first substrate;
   forming a color filter on the second substrate;
   forming a common electrode on one of the first and second substrates;
   forming a repair film on one of the first and second substrates, wherein the repair film is a black matrix;
   attaching the first and second substrates and providing a liquid crystal layer between the first and second substrates to form a liquid crystal display panel;
   testing the liquid crystal display panel to detect a bright point defect;
   irradiating an area of the repair film corresponding to the bright point defect using laser light; and
   scanning the irradiated laser light in the predetermined portion to block light transmission through the bright point defect.

14. A method of manufacturing a liquid crystal display device, comprising:
   providing a first substrate and a second substrate;
   forming a data line and a gate line on the first substrate, the data line and the gate lines crossing each other;
   forming a thin film transistor at a crossing of the data and gate lines;
   forming a pixel electrode on the first substrate;
   forming a color filter on the second substrate;

forming a common electrode on one of the first and second substrates;

forming a repair film on one of the first and second substrates, wherein the repair film is a pattern spacer;

attaching the first and second substrates and providing a liquid crystal layer between the first and second substrates to form a liquid crystal display panel;

testing the liquid crystal display panel to detect a bright point defect;

irradiating an area of the repair film corresponding to the bright point defect using laser light; and scanning the irradiated laser light in the predetermined portion to block light transmission through the bright point defect.

15. A method of manufacturing a liquid crystal display device, comprising:

providing a first substrate and a second substrate;

forming a data line and a gate line on the first substrate, the data line and the gate lines crossing each other;

forming a thin film transistor at a crossing of the data and gate lines;

forming a pixel electrode on the first substrate;

forming a color filter on the second substrate;

forming a common electrode on one of the first and second substrates;

forming a repair film on one of the first and second substrates, wherein the repair film is a ball spacer;

attaching the first and second substrates and providing a liquid crystal layer between the first and second substrates to form a liquid crystal display panel;

testing the liquid crystal display panel to detect a bright point defect;

irradiating an area of the repair film corresponding to the bright point defect using laser light; and scanning the irradiated laser light in the predetermined portion to block light transmission through the bright point defect.

16. The method according to claim 1, further comprising forming a overcoat layer on the second substrate.

17. The method according to claim 13, further comprising forming a overcoat layer on the second substrate.

18. The method according to claim 13, wherein the color filter is formed on the repair film.

19. The method according to claim 14, wherein the repair film is formed on the color filter.

* * * * *